(12) United States Patent
deLevie

(10) Patent No.: US 12,505,299 B2
(45) Date of Patent: Dec. 23, 2025

(54) HALLUCINATION DETECTION AND REMEDIATION IN TEXT GENERATION INTERFACE SYSTEMS

(71) Applicant: Casetext, Inc., San Francisco, CA (US)

(72) Inventor: Alan deLevie, Washington, DC (US)

(73) Assignee: Casetext, Inc., San Francisco, CA (US)

( * ) Notice: Subject to any disclaimer, the term of this patent is extended or adjusted under 35 U.S.C. 154(b) by 314 days.

(21) Appl. No.: 18/450,776

(22) Filed: Aug. 16, 2023

(65) Prior Publication Data

US 2025/0061279 A1 Feb. 20, 2025

(51) Int. Cl.
| | | |
|---|---|---|
| G06F 40/30 | (2020.01) | |
| G06F 16/3329 | (2025.01) | |
| G06F 16/334 | (2025.01) | |
| G06F 16/34 | (2025.01) | |
| G06F 40/194 | (2020.01) | |

(52) U.S. Cl.
CPC .......... G06F 40/30 (2020.01); G06F 16/3329 (2019.01); G06F 16/3344 (2019.01); G06F 16/345 (2019.01); G06F 40/194 (2020.01)

(58) Field of Classification Search
CPC ............. G06F 16/3329; G06F 16/3344; G06F 16/345; G06F 40/194; G06F 40/30
See application file for complete search history.

(56) References Cited

U.S. PATENT DOCUMENTS

| | | |
|---|---|---|
| 7,257,766 B1 | 8/2007 | Koppel et al. |
| 7,293,012 B1 | 11/2007 | Solaro et al. |
| 8,380,710 B1 | 2/2013 | Finne et al. |
| 8,812,291 B2 | 8/2014 | Brants et al. |
| 10,565,639 B1 | 2/2020 | Ghamsari et al. |
| 11,232,161 B1* | 1/2022 | Qu .................. G06V 20/52 |
| 11,281,976 B2 | 3/2022 | Dua et al. |
| 11,481,416 B2 | 10/2022 | Dua et al. |
| 2005/0108219 A1 | 5/2005 | Huerga |
| 2005/0278623 A1* | 12/2005 | Dehlinger ............ G06F 16/313 707/E17.084 |
| 2007/0022109 A1 | 1/2007 | Imielinski et al. |
| 2007/0266331 A1 | 11/2007 | Bicker et al. |
| 2009/0083248 A1 | 3/2009 | Liu et al. |

(Continued)

FOREIGN PATENT DOCUMENTS

CN  109213870 A  1/2019

OTHER PUBLICATIONS

U.S. Appl. No. 18/154,175, Final Office Action mailed Jun. 29, 2023, 22 pgs.

(Continued)

*Primary Examiner* — Eric Yen

(57) ABSTRACT

Enumerated source text passages may be determined based on one or more source text documents. The enumerated source text passages may include source text passage identifiers uniquely identifying the passages. A novel text passage including novel text portions may be determined based on a query and the enumerated source text passages. One or more of the novel text portions may be verified by a large language model to produce text verification information. A novel text generation message including novel text generated by the large language model may be determined based on the text verification information and sent to a client machine.

20 Claims, 10 Drawing Sheets

(56) References Cited

U.S. PATENT DOCUMENTS

| | | | |
|---|---|---|---|
| 2010/0145673 A1 | 6/2010 | Cancedda | |
| 2011/0125734 A1 | 5/2011 | Duboue et al. | |
| 2012/0030201 A1 | 2/2012 | Pickering et al. | |
| 2014/0358889 A1 | 12/2014 | Shmiel et al. | |
| 2018/0075011 A1 | 3/2018 | Allen et al. | |
| 2018/0322110 A1 | 11/2018 | Rhodes et al. | |
| 2019/0042551 A1 | 2/2019 | Hwang | |
| 2020/0019642 A1 | 1/2020 | Dua et al. | |
| 2020/0159783 A1 | 5/2020 | Shlyunkin et al. | |
| 2020/0243076 A1 | 7/2020 | Kim | |
| 2020/0342862 A1 | 10/2020 | Gao et al. | |
| 2020/0364403 A1 | 11/2020 | Choi et al. | |
| 2021/0124876 A1 | 4/2021 | Kryscinski et al. | |
| 2021/0326428 A1 | 10/2021 | Edwards et al. | |
| 2021/0374341 A1 | 12/2021 | Krause et al. | |
| 2022/0027553 A1* | 1/2022 | Xu | G06F 40/157 |
| 2022/0051479 A1 | 2/2022 | Agarwal et al. | |
| 2022/0164397 A1 | 5/2022 | Escalona et al. | |
| 2022/0180051 A1 | 6/2022 | Lillemo et al. | |
| 2022/0197958 A1 | 6/2022 | Volynets et al. | |
| 2022/0253447 A1 | 8/2022 | Boytsov et al. | |
| 2022/0261429 A1 | 8/2022 | Refaeli et al. | |
| 2022/0284174 A1 | 9/2022 | Galitsky | |
| 2022/0300718 A1 | 9/2022 | Chen et al. | |
| 2022/0382975 A1 | 12/2022 | Gu et al. | |
| 2023/0034011 A1 | 2/2023 | Sarkar et al. | |
| 2023/0080674 A1 | 3/2023 | Attali et al. | |
| 2023/0092702 A1 | 3/2023 | Mao et al. | |
| 2023/0108863 A1 | 4/2023 | Gunasekara et al. | |
| 2023/0121711 A1 | 4/2023 | Chhaya et al. | |
| 2023/0245051 A1 | 8/2023 | Vuyyuri et al. | |
| 2023/0409298 A1* | 12/2023 | Ciminelli | G06F 3/04842 |
| 2024/0111960 A1* | 4/2024 | Earle | G06F 40/35 |
| 2024/0160838 A1* | 5/2024 | Anoun | G06V 30/416 |
| 2024/0256764 A1* | 8/2024 | Maschmeyer | G06F 16/3328 |
| 2024/0296279 A1* | 9/2024 | Gardner | G06F 40/169 |
| 2024/0296295 A1* | 9/2024 | Russell | G06F 40/56 |

OTHER PUBLICATIONS

U.S. Appl. No. 18/154,175, Non Final Office Action mailed Apr. 21, 2023, 20 pgs.

U.S. Appl. No. 18/169,701, Final Office Action mailed Jun. 29, 2023, 42 pgs.

U.S. Appl. No. 18/169,701, Non Final Office Action mailed May 3, 2023, 38 pgs.

U.S. Appl. No. 18/169,707, Non Final Office Action mailed May 10, 2023, 33 pgs.

U.S. Appl. No. 18/333,320, Non Final Office Action mailed Aug. 7, 2023, 13 pgs.

Lewis, Patrick et al. Retrieval-Augmented Generation for Knowledge-Intensive NLP Tasks. Facebook AI Research, University College London; New York University; Apr. 12, 2021.

Liu, Jiongnan et al., "RETA-LLM: A Retrieval-Augmented Large Language Model Toolkit", 1Gaoling School of Artificial Intelligence, Renmin University of China, University of Science and Technology of China, Jun. 8, 2023.

Liu, Nelson F. et al., "Evaluating Verifiability in Generative Search Engines", Department of Computer Science, Stanford University, Apr. 19, 2023.

* cited by examiner

HALLUCINATION DETECTION AND REMEDIATION IN TEXT GENERATION INTERFACE SYSTEMS

FIELD OF TECHNOLOGY

This patent document relates generally to natural language processing systems and more specifically to systems involving large language models.

BACKGROUND

Natural language processing systems are increasingly sophisticated. Large language models are pre-trained to generate text. A large language model may be provided with input text, such as a question. The model may then provide output text in response, such as an answer to the question. Recent advances have led large language models to become increasingly powerful, often able to produce text that approaches that which would be generated by humans.

A common requirement in text generation is that the facts asserted in generated text must be truthful. In some contexts, facts must be verifiable through consulting citing references. Although the accuracy of LLM-generated text is higher than previous methods, there remains a small but significant risk that the text will contain inaccuracies, sometimes referred to as "hallucinations." However, individuals relying on such generated texts need to ensure the text is accurate and factually backed up by its source material. A common framing of LLM-based text generation procedures is that the output of the software is not perfect. Such work is generally reliable, but must still go through careful review by a person. Accordingly, improved techniques for hallucination detection and remediation are desired.

BRIEF DESCRIPTION OF THE DRAWINGS

The included drawings are for illustrative purposes and serve only to provide examples of possible structures and operations for the disclosed inventive systems, apparatus, methods and computer program products for natural language processing. These drawings in no way limit any changes in form and detail that may be made by one skilled in the art without departing from the spirit and scope of the disclosed implementations.

DETAILED DESCRIPTION

Figure 1:
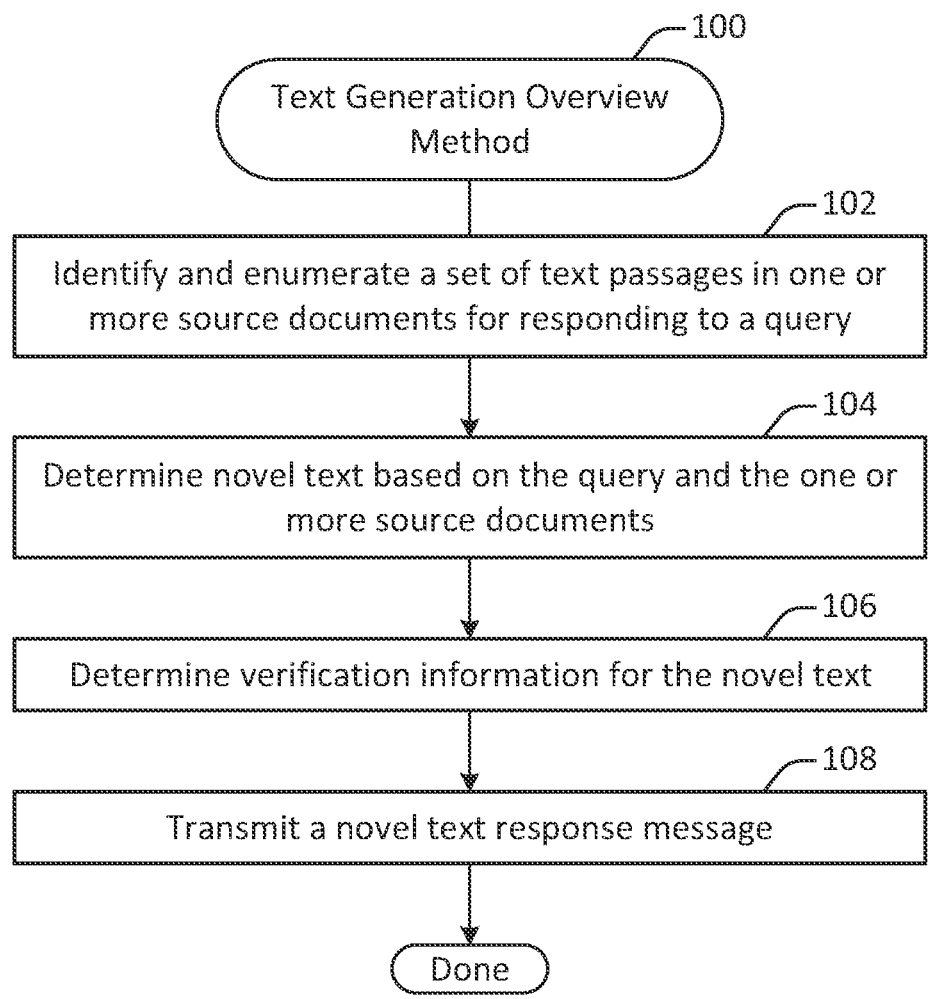
FIG. 1 illustrates an overview method for generating novel text, performed in accordance with one or more embodiments.

Techniques and mechanisms described herein provide for the generation of novel text via a large language model in ways that detect and correct instances of factually incorrect information. Novel text is generated at the passage level, in short units of semantic meaning. The large language model is tasked not only with generating the novel text, but also with providing citations to unique identifiers or source passages. The resulting novel text may then be fact-checked against the source passages before assembling the final result.

Large language models operate through a process called "prompting." In this process, a text is passed to the model (the "prompt"), and the model returns a sequence of tokens (sometimes called a "completion") that it determines has a high probability of following the prompt. The probability is determined through advanced model architecture and a massive corpora of training data. During the training process, the model learns billions of weights, or parameters. Information from those weights is referred to as "parametric memory".

Often, a completion will have the appearance of correctness. That is, the form and structure of the text reads to a human as correct, but the substance may not be. For example, large language models trained on legal texts have been observed to "hallucinate" citations to legal opinions recorded in reports. The model has learned the proper form of a reporter citation, and thus can emit plausible-looking citations, that in fact, do not exist.

According to various embodiments, techniques and mechanisms described herein provide for the generation of novel text in such a way that hallucinated citations and other facts can be reliably and accurately verified by an automated process. These techniques and mechanisms may involve large language model prompting, other machine learning methods (e.g., entailment classification, named entity recognition), and/or strict rules-based entity extraction (e.g., regular expressions).

In some embodiments, text may be generated at the passage level, where a passage is a short unit of semantic meaning. For example, a passage may be a sentence. Alternatively, or additionally, a passage may be a shorter unit of text, such as a phrase, or a longer unit of text, such as a paragraph. The prompt to the large language model that provides instructions for generating passages, such as a summary or one or more answers to questions, also instructs the LLM to provide citations to unique identifiers of source passages.

Because each generated passage is short, and because the source passages factually supporting it are identified, the computational workload involved in fact checking is reduced. For example, it is simpler to fact check a single generated sentence against three to five source sentences, than it is to check an entire generated document comprising many pages against even more pages of source documents. Thus, techniques and mechanisms described herein provide for substantially improved computational efficiency in the generation of text via large language models.

According to various embodiments, techniques and mechanisms described herein provide for novel text generation in domain-specific contexts. A text generation interface system may take as input one or more arbitrary documents, process them via optical text recognition, segment them into portions, and process the segmented text via various tasks based on need. Different workflows are provided for different tasks, and this application describes a number of examples of such workflows. In many workflows, an input document is divided into chunks via a chunking technique. Then, chunks are inserted into prompt templates for processing by a large language model such as the GPT-3 or GPT-4 available from OpenAI. The large language model's response is then parsed and potentially used to trigger additional analysis, such as one or more database searches, one or more additional prompts sent back to the large language model, and/or a response returned to a client machine.

According to various embodiments, techniques and mechanisms described herein provide for a sophisticated document processing pipeline. The pipeline receives one or more input documents, identifies text that should be kept together, identifies extraneous text such as headers, footers, and line numbers, and segments the text accordingly. In this way, the quality of the text provided to the rest of the system is improved.

According to various embodiments, techniques and mechanisms described herein provide for new approaches to text segmentation. Large language models often receive as input a portion of input text and generate in response a portion of output text. In many systems, the large language model imposes a limit on the input text size. Accordingly, in the event that the large language model is asked to summarize a lengthy document, the document may need to be segmented into portions in order to achieve the desired summarization.

Conventional text segmentation techniques frequently create divisions in text that negatively affect the performance of the model, particularly in domains-specific contexts such as law. For example, consider a caption page of a legal brief, which includes text in a column on the left that encompasses the parties, text in a column on the right that includes the case number, a title that follows lower on the page, and line numbering on the left. In such a configuration, the text in the different columns should not be mixed and should be treated separately from the line numbers, while both columns should precede the document title, when converting the document to an input query for a large language model. However, conventional techniques would result in these semantically different elements of text being jumbled together, resulting in an uninformative query provided to the large language model and hence a low-quality response. In contrast to these conventional techniques, techniques and mechanisms described herein provide for a pipeline that cleans such raw text so that it can be provided to a large language model.

According to various embodiments, techniques and mechanisms described herein provide for the division of text into chunks, and the incorporation of those chunks into prompts that can be provided to a large language model. For instance, a large language model may impose a limit of, for instance, 8,193 tokens on a task, including text input, text output, and task instructions. In order to process longer documents, the system may split them. However, splitting a document can easily destroy meaning depending on where and how the document is split. Techniques and mechanisms described herein provide for evenly splitting a document or documents into chunks, and incorporating those chunks into prompts, in ways that retain the semantic content associated with the raw input document or documents.

In some embodiments, techniques and mechanisms described herein may be applied to generate novel text in domain-specific contexts, such as legal analysis. Large language models, while powerful, have a number of drawbacks when used for technical, domain-specific tasks. When using conventional techniques, large language models often invent "facts" that are actually not true. For instance, if asked to summarize the law related to non-obviousness in the patent context, a large language model might easily invent a court case, complete with caption and ruling, that in fact did not occur. In contrast to conventional techniques, techniques and mechanisms described herein provide for the generation of novel text in domain-specific contexts while avoiding such drawbacks.

According to various embodiments, techniques and mechanisms described herein may be used to automate complex, domain-specific tasks that were previously the sole domain of well-trained humans. Moreover, such tasks may be executed in ways that are significantly faster, less expensive, and more auditable than the equivalent tasks performed by humans. For example, a large language model may be employed to produce accurate summaries of legal texts, to perform legal research tasks, to generate legal documents, to generate questions for legal depositions, and the like.

In some embodiments, techniques and mechanisms described herein may be used to divide text into portions while respecting semantic boundaries and simultaneously reducing calls to the large language model. The cost of using many large language models depends on the amount of input and/or output text. Accordingly, techniques and mechanisms described herein provide for reduced overhead associated with prompt instructions while at the same time providing for improved model context to yield an improved response.

In some embodiments, techniques and mechanisms described herein may be used to process an arbitrary number of unique documents (e.g., legal documents) that cannot be accurately parsed and processed via existing optical character recognition and text segmentation solutions.

In some embodiments, techniques and mechanisms described herein may be used to link a large language model with a legal research database, allowing the large language model to automatically determine appropriate searches to perform and then ground its responses to a source of truth (e.g., in actual law) so that it does not "hallucinate" a response that is inaccurate.

In some embodiments, techniques and mechanisms described herein provide for specific improvements in the legal domain. For example, tasks that were previously too laborious for attorneys with smaller staffs may now be more easily accomplished. As another example, attorneys may automatically analyze large volumes of documents rather than needing to perform such tasks manually. As another example, text chunking may reduce token overhead and hence cost expended on large language model prompts. As yet another example, text chunking may reduce calls to a large language model, increasing response speed. As still another example, text chunking may increase and preserve context provided to a large language model by dividing text into chunks in semantically meaningful ways.

According to various embodiments, techniques and mechanisms described herein may provide for automated solutions for generated text in accordance with a number of specialized applications. Such applications may include, but are not limited to: simplifying language, generating correspondence, generating a timeline, reviewing documents, editing a contract clause, drafting a contract, performing legal research, preparing for a depositions, drafting legal interrogatories, drafting requests for admission, drafting requests for production, briefing a litigation case, responding to requests for admission, responding to interrogatories, responding to requests for production, analyzing cited authorities, and answering a complaint.

FIG. 1 illustrates a method 100 for generating novel text, performed in accordance with one or more embodiments. The method 100 may be performed at a text generation interface system such as the text generation interface system 210 shown in FIG. 2. The method 100 may be performed in order to generate novel text via a large language model while verifying and, if needed, correcting the generated text for accuracy.

A set of text passages in one or more source documents for responding to a query are identified and enumerated at 102. According to various embodiments, any of a variety of types of queries may be executed. For example, a query may request that the one or more source documents be summarized. As another example, a query may identify one or more natural language questions be answered based on the one or more source documents. As yet another example, a query may instruct the system to generate an argument based on information drawn from the one or more source documents.

According to various embodiments, identifying and enumerating the set of text passages may involve dividing the source documents into text chunks. The text chunks may be further divided into passages such as sentences, phrases, or paragraphs. The text passages may be evaluated for relevance. A text passage may be assigned a text passage identifier that uniquely identifies the text passages. The text passages and the associated text passages identifiers may be stored for subsequent use and analysis. Additional details regarding pre-processing source text, including the identification and enumeration of text passages, are discussed with respect to the method 800 shown in FIG. 8.

A novel text is determined at 104 based on the query and the one or more source documents. According to various embodiments, determining the novel text may involve determining one or more query response prompts based on a text generation prompt template, the query, and a subset of the enumerated source text passages. The one or more text generation prompts may then be transmitted to a large language model for completion. The large language model may return one or more completed text generation prompts, which may be parsed by the text generation interface system to determine identify the novel text. Additional details regarding the determination of a novel text are discussed with respect to the method 900 shown in FIG. 9.

At 106, verification information is determined for the novel text. In some embodiments, the verification information may indicate which, if any, of the novel text portions are unsupported or partially supported by the one or more enumerated source text passages initially identified by the large language model as supporting the novel text portions. Determining the verification information may involve, for instance, transmitting to the large language model a text verification prompt that includes both a novel text portion and one or more enumerated source text passages used to support the novel text portion. The prompt may also include one or more instructions to the large language model to verify the novel text portion based on the enumerated source text passages. A text verification response message received from the large language model may be parsed to identify the verification information.

A novel text response message is transmitted at 108. In some implementations, the novel text response message may include some or all of the novel text. The novel text response message may also include text verification information that indicates an extent to which one or more portions of the novel text are accurately supported by the source material. Additional details regarding the determination of the verification information and the transmission of the novel text response message are discussed with respect to the method 1000 shown in FIG. 10.

Figure 2:
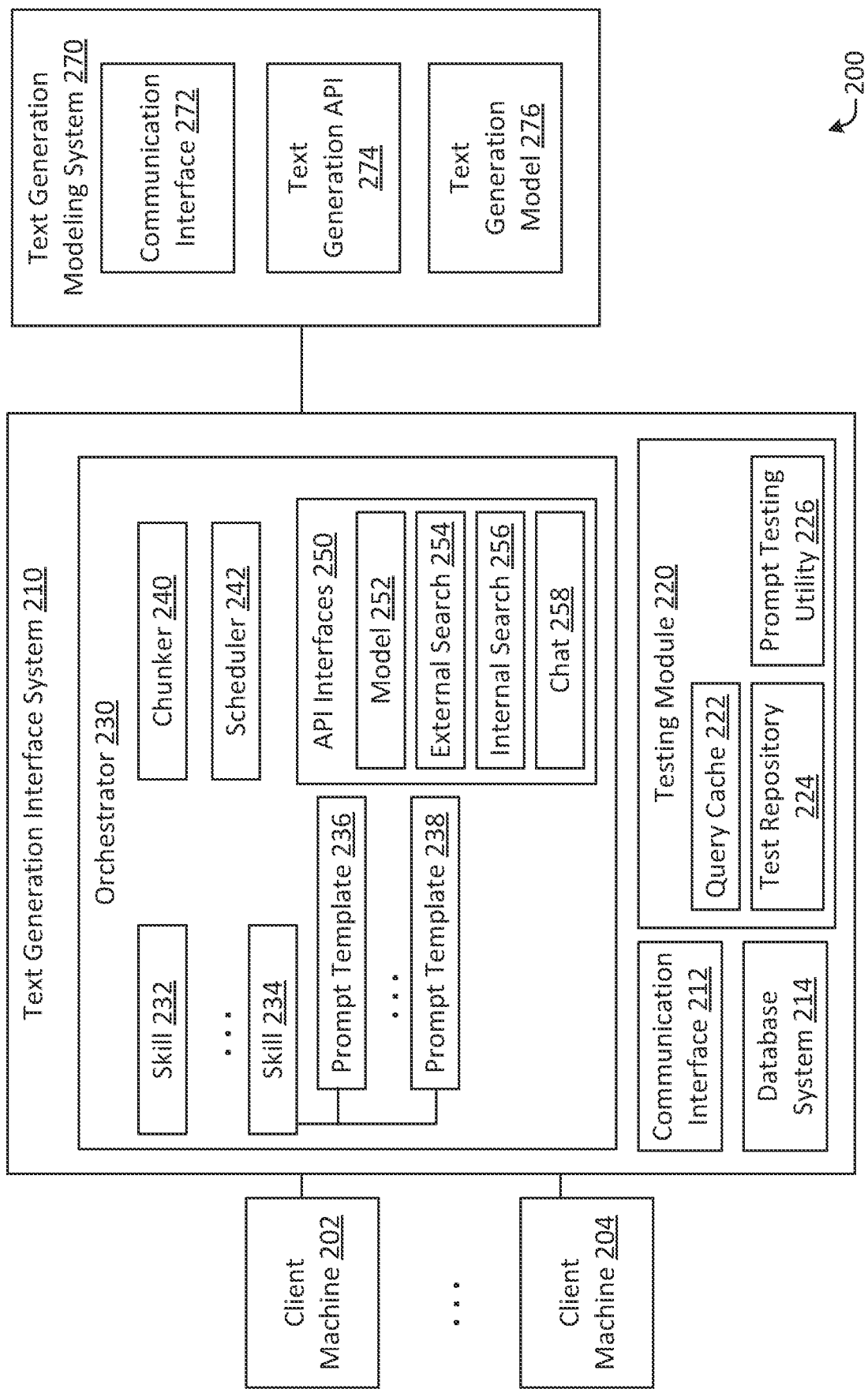
FIG. 2 illustrates a text generation system, configured in accordance with one or more embodiments.

FIG. 2 illustrates a text generation system 200, configured in accordance with one or more embodiments. The text generation system 200 includes client machines 202 through 204 in communication with a text generation interface system 210, which in turn is in communication with a text generation modeling system 270. The text generation modeling system 270 includes a communication interface 272, a text generation API 274, and a text generation model 276. The text generation interface system 210 includes a communication interface 212, a database system 214, a testing module 220, and an orchestrator 230. The testing module 220 includes a query cache 222, a test repository 224, and a prompt testing utility 226. The orchestrator 230 includes skills 232 through 234, and prompt templates 236 through 238. The orchestrator also includes a chunker 240 and a scheduler 242. The orchestrator also includes API interfaces 250, which include a model interface 252, an external search interface 254, an internal search interface 256, and a chat interface 258.

According to various embodiments, a client machine may be any suitable computing device or system. For instance, a client machine may be a laptop computer, desktop computer, mobile computing device, or the like. Alternatively, or additionally, a client machine may be an interface through which multiple remote devices communicate with the text generation interface system 210.

According to various embodiments, a client machine may interact with the text generation interface system in any of various ways. For example, a client machine may access the text generation interface system via a text editor plugin, a dedicated application, a web browser, other types of interactions techniques, or combinations thereof.

According to various embodiments, the text generation modeling system 270 may be configured to receive, process, and respond to requests via the communication interface 272, which may be configured to facilitate communications via a network such as the internet.

In some embodiments, some or all of the communication with the text generation modeling system 270 may be conducted in accordance with the text generation API 274, which may provide remote access to the text generation model 276. The text generation API 274 may provide functionality such as defining standardized message formatting, enforcing maximum input and/or output size for the text generation model, and/or tracking usage of the text generation model.

According to various embodiments, the text generation model 276 may be a large language model. The text generation model 276 may be trained to predict successive words in a sentence. It may be capable of performing functions such as generating correspondence, summarizing text, and/or evaluating search results. The text generation model 276 may be pre-trained using many gigabytes of input text and may include billions or trillions of parameters.

In some embodiments, large language models impose a tradeoff. A large language model increases in power with the number of parameters and the amount of training data used to train the model. However, as the model parameters and input data increase in magnitude, the model's training cost, storage requirements, and required computing resources increase as well. Accordingly, the large language model may be implemented as a general-purpose model configured to generate arbitrary text. The text generation interface system 210 may serve as an interface between the client machines and the text generation modeling system 270 to support the use of the text generation modeling system 270 for performing complex, domain-specific tasks in fields such as law. That is, the text generation interface system 210 may be configured to perform one or more methods described herein.

According to various embodiments, the orchestrator 230 facilitates the implementation of one or more skills, such as the skills 232 through 234. A skill may act as a collection of interfaces, prompts, actions, data, and/or metadata that collectively provide a type of functionality to the client machine. For instance, a skill may involve receiving information from a client machine, transmitting one or more requests to the text generation modeling system 270, processing one or more response received form the text generation modeling system 270, performing one or more searches, and the like. Skills are also referred to herein as text generation flows.

In some embodiments, a skill may be associated with one or more prompts. For instance, the skill 234 is associated with the prompt templates 236 and 238. A prompt template may include information such as instructions that may be provided to the text generation modeling system 270. A prompt template may also include one or more fillable portions that may be filled based on information determined by the orchestrator 230. For instance, a prompt template may be filled based on information received from a client machine, information returned by a search query, or another information source.

In some implementations, the chunker 240 is configured to divide text into smaller portions. Dividing text into smaller portions may be needed at least in part to comply with one or more size limitations associated with the text. For instance, the text generation API 274 may impose a maximum size limit on prompts provided to the text generation model 276. The chunker may be used to subdivide text included in a request from a client, retrieved from a document, returned in a search result, or received from any other source.

According to various embodiments, the API interfaces 250 include one or more APIs for interacting with internal and/or external services. The model interface 252 may expose one or more functions for communicating with the text generation modeling system 270. For example, the model interface 252 may provide access to functions such as transmitting requests to the text generation modeling system 270, receiving responses from the text generation modeling system 270, and the like.

In some embodiments, the external search interface 254 may be used to search one or more external data sources such as information repositories that are generalizable to multiple parties. For instance, the external search interface 254 may expose an interface for searching legal case law and secondary sources.

In some implementations, the internal search interface 256 may facilitate the searching of private documents. For instance, a client may upload or provide access to a set of private documents, which may then be indexed by the text generation interface system 210.

According to various embodiments, the chat interface 258 may facilitate text-based communication with the client machines. For instance, the chat interface 258 may support operations such as parsing chat messages, formulating responses to chat messages, identifying skills based on chat messages, and the like. In some configurations, the chat interface 258 may orchestrate text-based chat communication between a user at a client machine and the text generation model 276, for instance via web sockets.

In some embodiments, the query cache 222 may store queries such as testing queries sent to the text generation modeling system 270. Then, the query cache 222 may be instructed to return a predetermined result to a query that has already been sent to the text generation modeling system 270 rather than sending the same query again.

In some embodiments, the prompt testing utility 226 is configured to perform operations such as testing prompts created based on prompt templates against tests stored in the test repository 224.

In some embodiments, the communication interface 212 is configured to facilitate communications with the client machines and/or the text generation modeling system 270 via a network such as the internet. The scheduler 242 may be responsible for scheduling one or more tasks performed by the text generation interface system 210. For instance, the scheduler may schedule requests for transmission to the text generation modeling system 270.

In some embodiments, the database system 214 is configured to store information determined based on natural language. For example, the database system 214 may be configured to store one or more database tables that include fields corresponding with information extracted from natural language documents. As another example, the database system 214 may be configured to store metadata information about documents based on information extracted from those documents. As yet another example, the database system 214 may be configured to store linkages between documents and document portions.

According to various embodiments, the database system 214 may be configured using any of a variety of suitable database technologies. For instance, the database system 214 may be configured as a relational database system, a non-relational database system, or any other type of database system capable of supporting the storage and querying of information described herein.

Figure 3:
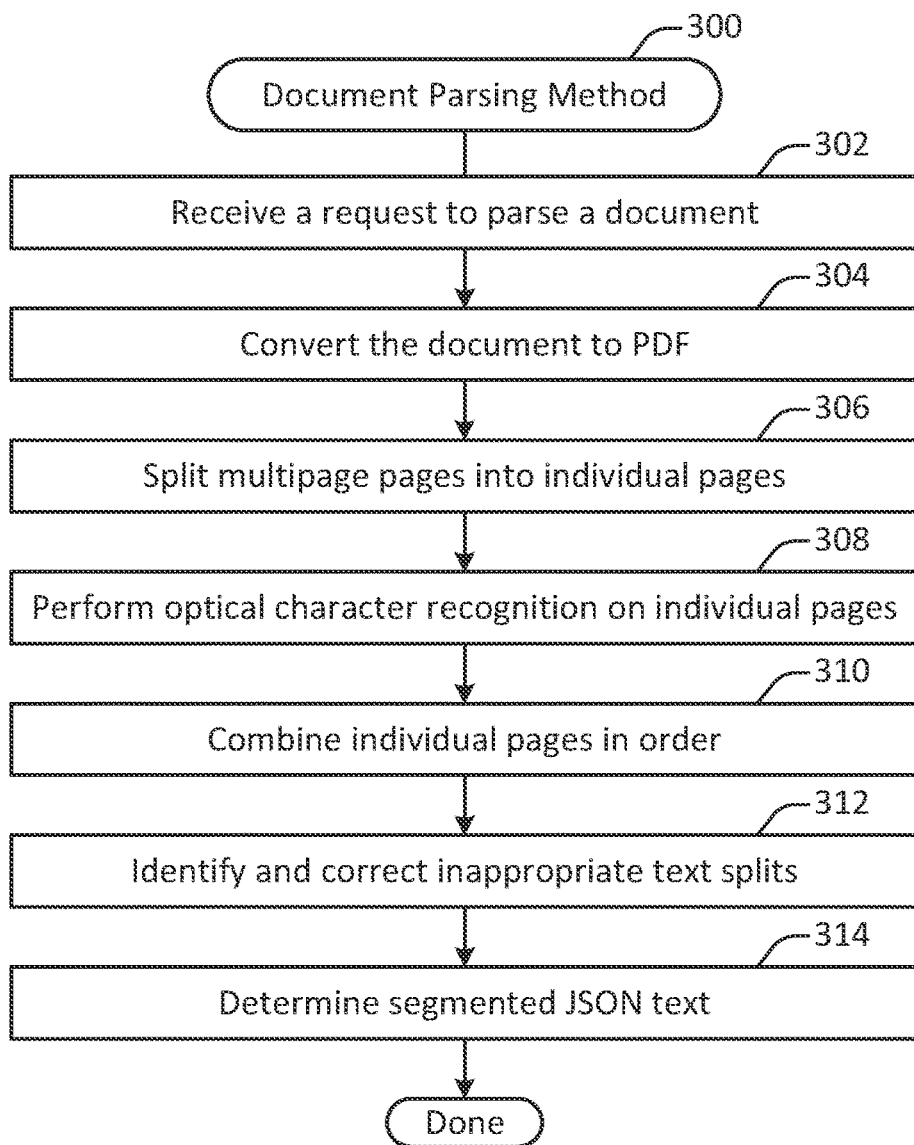
FIG. 3 illustrates a document parsing method, performed in accordance with one or more embodiments.

FIG. 3 illustrates a document parsing method 300, performed in accordance with one or more embodiments. According to various embodiments, the method 300 may be performed on any suitable computing system. For instance, the method 300 may be performed on the text generation interface system 230 shown in FIG. 2. The method 300 may be performed in order to convert a document into usable text while at the same time retaining metadata information about the text, such as the page, section, and/or document at which the text was located.

A request to parse a document is received at 302. In some embodiments, the request to parse a document may be generated when a document is identified for analysis. For example, as discussed herein, a document may be uploaded or identified by a client machine as part of communication with the text generation interface system 230. As another example, a document may be returned as part of a search result.

The document is converted to portable document format (PDF) or another suitable document format at 304. In some embodiments, the document need only be converted to PDF if the document is not already in the PDF format. Alternatively, PDF conversion may be performed even on PDFs to ensure that PDFs are properly formatted. PDF conversion may be performed, for instance, by a suitable Python library or the like. For instance, PDF conversion may be performed with the Hyland library.

Multipage pages are split into individual pages at 306. In some implementations, multipage pages may be split into individual pages via a machine learning model. The machine learning model may be trained to group together portions of text on a multipage page. For instance, a caption page in a legal decision may include text in a column on the left that encompasses the parties, text in a column on the right that includes the case number, a title that follows lower on the page, and line numbering on the left. In such a configuration, the machine learning model may be trained to treat separately the text in the different columns, and to separate the text from the line numbers. The document title may be identified as a first page, with the left column identified as the second page and the right column identified as the third page.

Optical character recognition is performed on individual pages or on the document as a whole at 308. In some implementations, optical character recognition may be performed locally via a library. Alternatively, optical character recognition may be performed by an external service. For instance, documents or pages may be sent to a service such as Google Vision. Performing optical character recognition on individual pages may provide for increased throughout via parallelization.

Individual pages are combined in order at 310. In some implementations, combining pages in order may be needed if optical character recognition were applied to individual pages rather than to the document as a whole.

Inappropriate text splits are identified and corrected at 312. In some embodiments, inappropriate text splits include instances where a paragraph, sentence, word, or other textual unit was split across different pages. Such instances may be identified by, for example, determining whether the first textual unit in a page represents a new paragraph, sentence, word, or other unit, or if instead it represents the continuation of a textual unit from the previous page. When such a split is identified, the continuation of the textual unit may be excised from the page on which it is located and moved to the end of the previous page. Such an operation may be performed by, for instance, the Poppler library available in Python.

Segmented JSON text is determined at 314. In some embodiments, the segmented JSON text may include the text returned by the optical character recognition performed at operation 308. In addition, the segmented JSON text may include additional information, such as one or more identifiers for the page, section, and/or document on which the text resides. The output of the segmented JSON may be further processed, for instance via the text sharding method 500 shown in FIG. 5 and/or the text chunking method 600 shown in FIG. 6.

Figure 4:
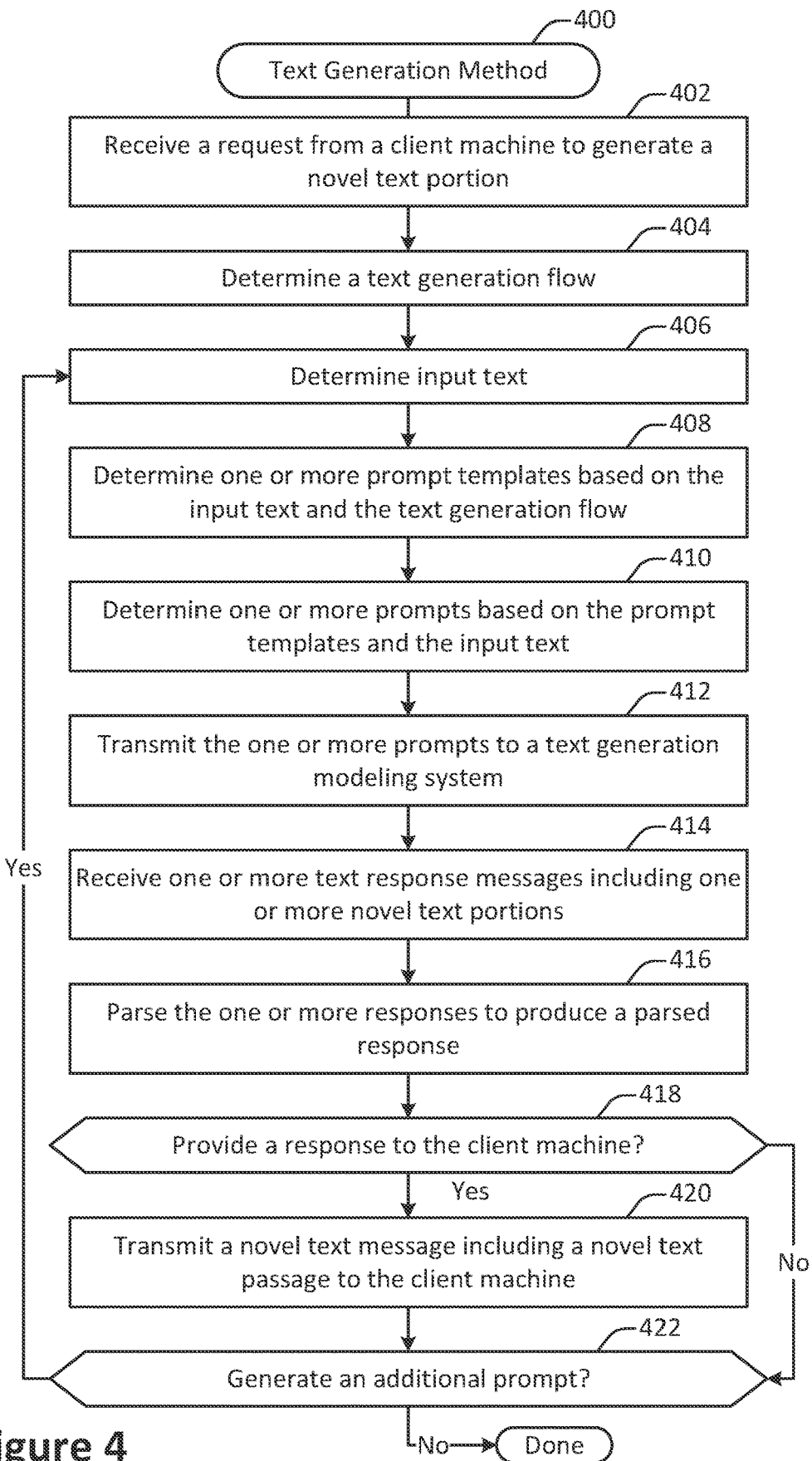
FIG. 4 illustrates a text generation method, performed in accordance with one or more embodiments.

FIG. 4 illustrates a text generation method 400, performed in accordance with one or more embodiments. According to various embodiments, the method 400 may be performed on any suitable computing system. For instance, the method 400 may be performed on the text generation interface system 230 shown in FIG. 2. The method 400 may be performed in order to identify and implement a text generation flow based on input text.

A request from a client machine to generate a novel text portion is received at 402. In some embodiments, the request may include a query portion. The query portion may include natural language text, one or more instructions in a query language, user input in some other format, or some combination thereof. For instance, the query portion may include an instruction to "write an email", "summarize documents", or "research case law".

In some embodiments, the request may include an input text portion. For example, the request may link to, upload, or otherwise identify documents. As another example, the request may characterize the task to be completed. For instance, the request may discuss the content of the desired email or other correspondence. The particular types of input text included in the request may depend in significant part on the type of request. Accordingly, many variations are possible.

A text generation flow is determined at 404. In some embodiments, the text generation flow may be explicitly indicated as part of the request received from the client machine. For instance, the client machine may select a particular text generation flow from a list. Alternatively, the text generation flow may be determined at least in part by analyzing the request received from the client machine. For example, the request may be analyzed to search for keywords or other indications that a particular text generation flow is desired. As another example, all or a portion of the request may be provided to a machine learning model to predict the requested text generation flow. In some configurations, a predicted text generation flow may be provided to the client machine for confirmation before proceeding.

Input text is determined at 406. In some embodiments, the input text may be determined by applying one or more text processing, search, or other operations based on the request received from the client machine. For example, the input text may be determined at least in part by retrieving one or more documents identified in or included with the request received from the client machine. As another example, the input text may be determined at least in part by applying one or more natural language processing techniques such as cleaning or tokenizing raw text.

In some embodiments, determining input text may involve executing a search query. For example, a search of a database, set of documents, or other data source may be executed based at least in part on one or more search parameters determined based on a request received from a client machine. For instance, the request may identify one or more search terms and a set of documents to be searched using the one or more search terms.

In some embodiments, determining input text may involve processing responses received from a text generation modeling system. For instance, all or a portion of the results from a request to summarizing a set of text portions may then be used to create a new set of more compressed input text, which may then be provided to the text generation modeling system for further summarization or other processing.

One or more prompt templates are determined at 408 based on the input text and the text generation flow. As discussed with respect to FIG. 2, different text generation flows may be associated with different prompt templates. Prompt templates may be selected from the prompt library based on the particular text generation flow.

At 410, one or more prompts based on the prompt templates are determined. In some embodiments, a prompt may be determined by supplementing and/or modifying a prompt template based on the input text. For instance, a portion of input text may be added to a prompt template at an appropriate location. As one example, a prompt template may include a set of instructions for causing a large language model to generate a correspondence document. The prompt template may be modified to determine a prompt by adding a portion of input text that characterizes the nature of the correspondence document to be generated. The added input text may identify information such as the correspondence recipient, source, topic, and discussion points.

The one or more prompts are transmitted to a text generation modeling system at 412. In some embodiments, the text generation modeling system may be implemented at a remote computing system. The text generation modeling system may be configured to implement a text generation model. The text generation modeling system may expose an application procedure interface via a communication interface accessible via a network such as the internet.

One or more text response messages are received from the remote computing system at 414. According to various embodiments, the one or more text response messages include one or more novel text portions generated by a text generation model implemented at the remote computing system. The novel text portions may be generated based at least in part on the prompt received at the text generation modeling system, including the instructions and the input text.

The one or more responses are parsed at 416 to produce a parsed response. In some embodiments, parsing the one or more responses may involve performing various types of processing operations. For example, in some systems a large language model may be configured to complete a prompt. Hence, a response message received from the large language model may include the instructions and/or the input text. Accordingly, the response message may be parsed to remove the instructions and/or the input text.

In some implementations, parsing the one or more responses may involve combining text from different responses. For instance, a document may be divided into a number of portions, each of which is summarized by the large language model. The resulting summaries may then be combined to produce an overall summary of the document.

A determination is made at 418 as to whether to provide a response to the client machine. In some embodiments, the determination made at 418 may depend on the process flow. For example, in some process flows, additional user input may be solicited by providing a response message determined based at least in part on one or more responses received from the text generation modeling system. As another example, in some process flows, a parsed response message may be used to produce an output message provided to the client machine.

If a response is to be provided to the client machine, then a client response message including a novel text passage is transmitted to the client machine at 420. In some embodiments, the client response message may be determined based in part on the text generation flow determined at 404 and in part based on the one or more text response messages received at 414 and parsed at 416.

A determination is made at 422 as to whether to generate an additional prompt. According to various embodiments, the determination as to whether to generate an additional prompt may be made based in part on the text generation flow determined at 404 and in part based on the one or more text response messages received at 414 and parsed at 416. As a simple example, a text generation flow may involve a set of prompts to summarize a set of portions, and then another round of interaction with the text generation modeling system to produce a more compressed summary.

According to various embodiments, the operations shown in FIG. 4 may be performed in an order different from that shown. Alternatively, or additionally, one or more operations may be omitted, and/or other operations may be performed. For example, a text generation flow may involve one or more search queries executed outside the context of the text generation modeling system. As another example, a text generation flow may involve one or more processes for editing, cleaning, or otherwise altering text in a manner not discussed with respect to FIG. 4. Various operations are possible.

Figure 5:
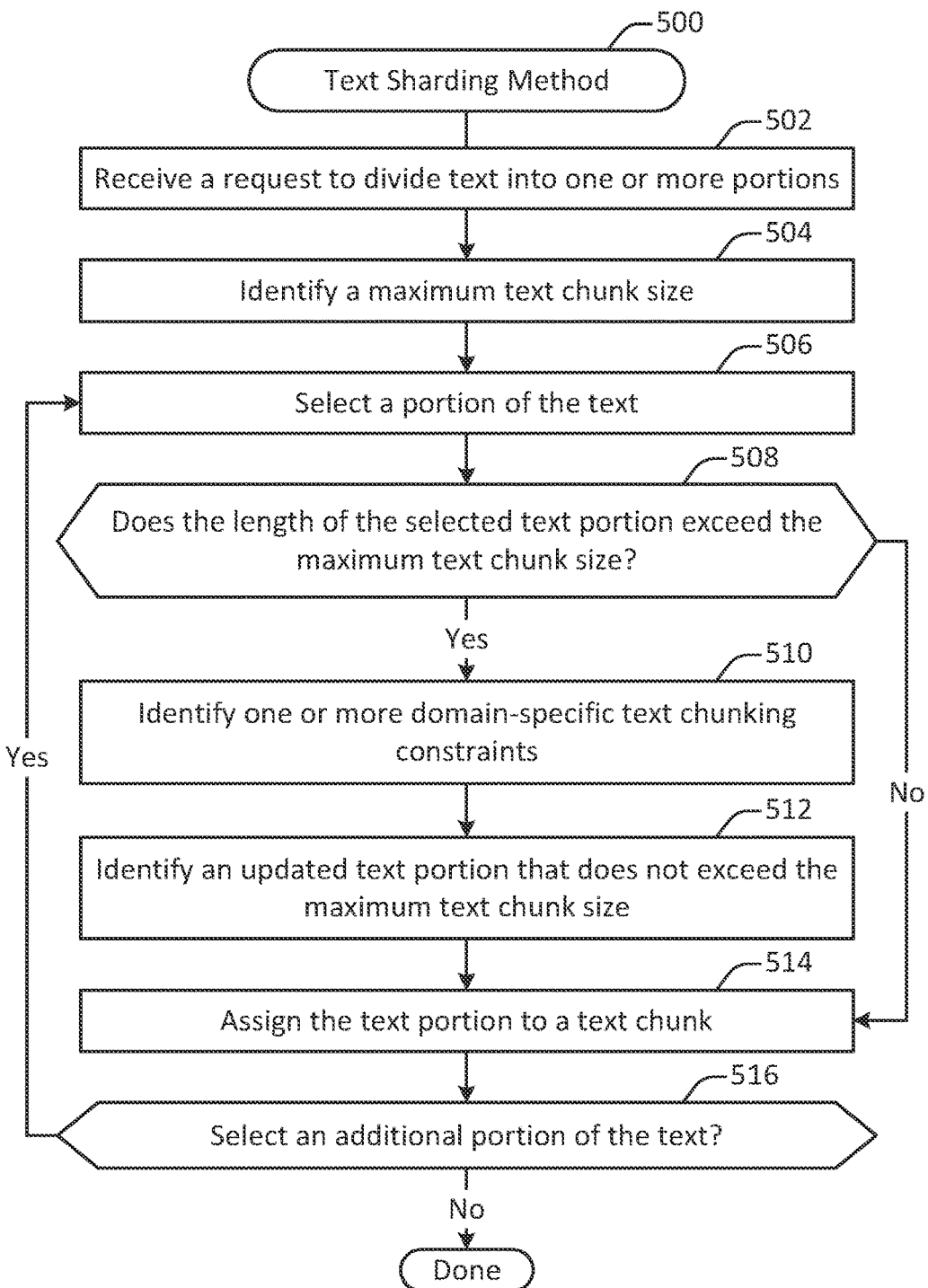
FIG. 5 illustrates a method of sharding text, performed in accordance with one or more embodiments.

FIG. 5 illustrates a method 500 of sharding text, performed in accordance with one or more embodiments. According to various embodiments, the method 500 may be performed on any suitable computing system. For instance, the method 500 may be performed on the text generation interface system 230 shown in FIG. 2. The method 500 may be performed in order to divide a body of text into potentially smaller units that fall beneath a designated size threshold, such as a size threshold imposed by an interface providing access to a large language model. For instance, a text generation modeling system implementing a large language model may specify a size threshold in terms of a number of tokens (e.g., words). As one example of such a threshold, a text generation modeling system may impose a limit of 8,193 tokens per query.

In particular embodiments, a size threshold may be adjusted based on considerations apart from a threshold imposed by an external text generation modeling system. For instance, a text generation interface system may formulate a prompt that includes input text as well as metadata such as one or more instructions for a large language model. In addition, the output of the large language model may be included in the threshold. If the external text generation modeling system imposes a threshold (e.g., 8,193 tokens), the text generation interface system 230 may need to impose a somewhat lower threshold when dividing input text in order to account for the metadata included in the prompt and/or the response provided by the large language model.

A request to divide text into one or more portions is received at 502. According to various embodiments, the request may be received as part of the implementation of one or more of the workflows shown herein. The request may identify a body of text. The body of text may include one or more documents, search queries, instruction sets, search results, and/or any other suitable text. In some configurations, a collection of text elements may be received. For instance, a search query and a set of documents returned by the search query may be included in the text.

In some implementations, text may be pre-divided into a number of different portions. Examples of divisions of text into portions may include, but are not limited to: lists of documents, documents, document sections, document pages, document paragraphs, and document sentences. Alternatively, or additionally, text may be divided into portions upon receipt at the text generation interface system 230. For instance, text may be divided into a set of portions via a text chunker, document parser, or other natural language processing tool.

A maximum text chunk size is identified at 504. In some embodiments, the maximum text chunk size may be identified based on one or more configuration parameters. In some configurations, the maximum text size may be imposed by the text generation interface system 230. Alternatively, or additionally, a size threshold may be imposed by an interface providing access to a large language model. As one example of a maximum text chunk size may be 100 kilobytes of text, 1 megabyte of text, 10 megabytes of text, or any other suitable chunk size.

A portion of the text is selected at 506. In some embodiments, as discussed herein, text may be pre-divided into text portion. Alternatively, or additionally, text may be divided into text portions as part of, or prior to, the operation of the method 500. As still another possibility, text may not be divided into portions. In such a configuration, the portion of text that is selected may be the entirety of the text. Then, the identification of one or more updated text portions at 512 may result in the division of the text into one or more portions as part of the operation of the method 500.

A determination is made at 508 as to whether the length of the selected text portion exceeds the maximum text chunk size. In some embodiments, the determination may be made by computing a length associated with the selected text portion and then comparing it with the maximum text chunk size. The calculation of the length associated with the selected text portion may be performed in different ways, depending on how the maximum text chunk size is specified. For instance, the maximum text chunk size may be specified as a memory size (e.g., in kilobytes or megabytes), as a number of words, or in some other fashion.

If it is determined that the length of the selected text portion exceeds the maximum text chunk size, then at 510 one or more domain-specific text chunking constraints are identified. In some embodiments, domain-specific text chunking constraints may be identified based on one or more pre-determined configuration parameters. For example, one domain-specific text chunking constraint may discourage division of a question and answer in a deposition transcript or other question/answer context. As another example, a domain-specific text chunking constraint may discourage splitting of a contract clause. As yet another example, a domain-specific text chunking constraint may discourage splitting of a minority and majority opinion in a legal opinion.

An updated text portion that does not exceed the maximum text chunk size is identified at 512. In some embodiments, the updated text portion may be determined by applying a more granular division of the text portion into small portions. For example, a document may be divided into sections, pages, or paragraphs. As another example, a document page or section may be divided into paragraphs. As another example, a paragraph may be divided into sentences. As still another example, a sentence may be divided into words. In particular embodiments, the updated text portion may be the sequentially first portion of the selected text portion that falls below the maximum text chunk size threshold identified at operation 504.

The text portion is assigned to a text chunk at 514. In some embodiments, the text may be associated with a sequence of text chunks. The text portions selected at 506 and identified at 512 may be assigned to these text chunks, for instance in a sequential order. That is, text portions near to one another in the text itself may be assigned to the same text chunk where possible to reduce the number of divisions between semantically similar elements of the text.

In particular embodiments, some attention may be paid to text divisions such as document, document section, paragraph, and/or sentence borders when assigning text portions to chunks. For instance, text portions belonging to the same document, document section, paragraph, and/or sentence may be grouped together when possible to ensure semantic continuity.

Figure 6:
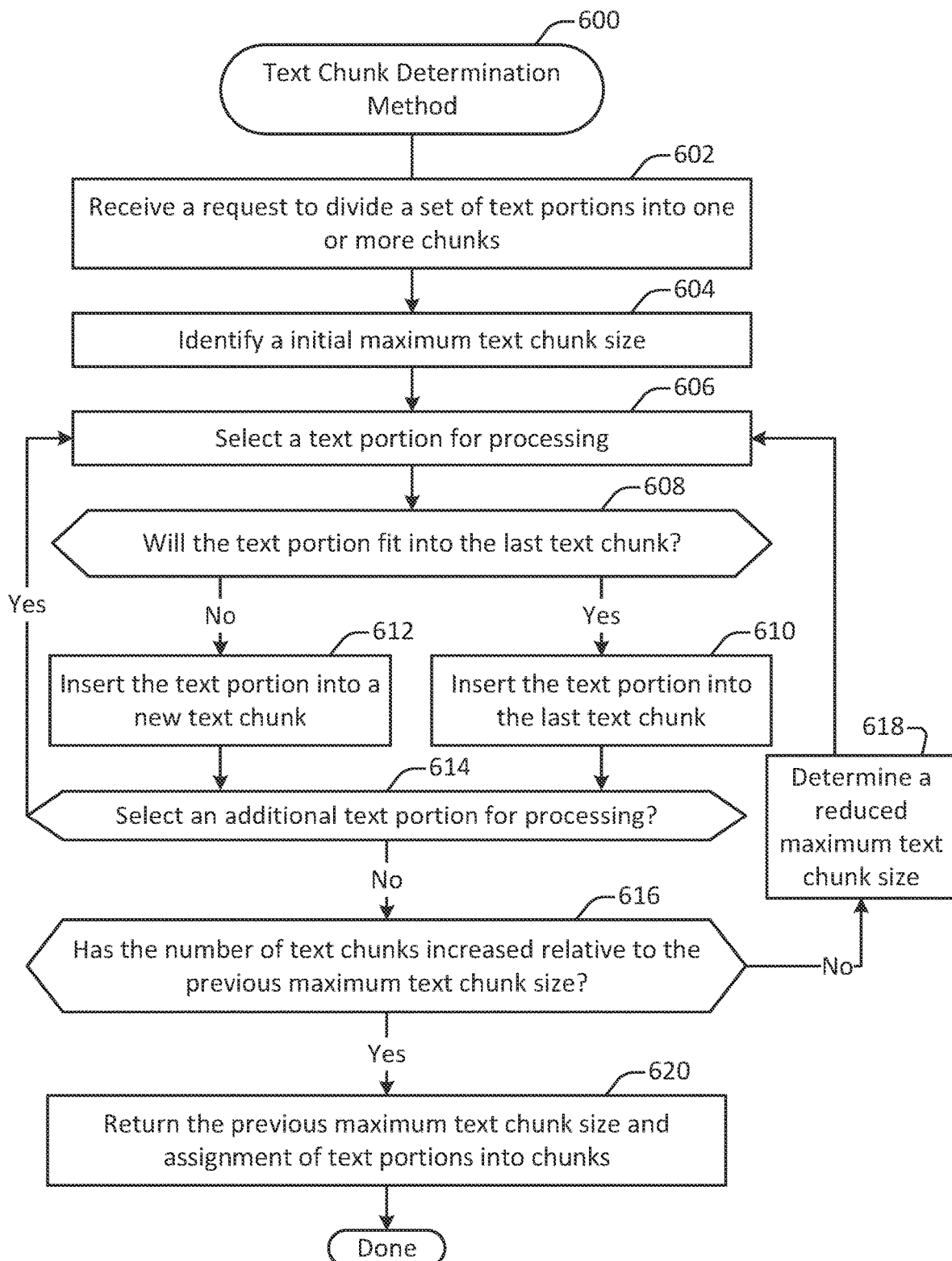
FIG. 6 illustrates a method for determining a text chunk, performed in accordance with one or more embodiments.

In particular embodiments, the method 500 may be performed in conjunction with the method 600 shown in FIG. 6. In such a configuration, operation 514 may be omitted. Alternatively, the assignment of text portions into text chunks in operation 514 may be treated as provisional, subject to subsequent adjustment via the method 600 shown in FIG. 6.

In some implementations, the identification of an updated text portion may result in the creation of two or more new text portions as a consequence of the division. In this case, the updated text portion may be assigned to a text chunk at 514, while the remainder portion or portions may be reserved for later selection at 506. Alternatively, or additionally, if two or more of the text portions resulting from the division at 512 each fall below the maximum text chunk size, then each of these may be assigned to a text chunk or chunks at operation 514.

A determination is made at 516 as to whether to select an additional portion of the text. According to various embodiments, additional portions of the text may continue to be selected as long as additional portions are available, or until some other triggering condition is met. For example, the system may impose a maximum amount of text for a particular interaction. As another example, the amount of text may exceed a designated threshold, such as a cost threshold.

FIG. 6 illustrates a text chunk determination method 600, performed in accordance with one or more embodiments. According to various embodiments, the method 600 may be performed on any suitable computing system. For instance, the method 600 may be performed on the text generation interface system 230 shown in FIG. 2. The method 600 may be performed in order to assign a set of text portions into text chunks.

In some embodiments, the method 600 may be used to compress text portions into text chunks of smaller size. For instance, the method 600 may receive as an input a set of text portions divided into text chunks of highly variable sizes, and then produce as an output a division of the same text portions into the same number of text chunks, but with the maximum text chunk size being lower due to more even distribution of text portions across text chunks.

A request is received at 602 to divide a set of text portions into one or more chunks. In some embodiments, the request may be automatically generated, for instance upon completion of the method 500 shown in FIG. 5. The request may identify, for instance, a set of text portions to divide into text chunks.

A maximum text chunk size is identified at 604. In some embodiments, the maximum text chunk size may be identified in a manner similar to that for operation 504 shown in FIG. 5.

A text portion is selected for processing at 606. In some embodiments, text portions may be selected sequentially. Sequential or nearly sequential ordering may ensure that semantically contiguous or similar text portions are often included within the same text chunk.

A determination is made at 608 as to whether the text portion fits into the latest text chunk. In some embodiments, text portions may be processed via the method 500 shown in FIG. 5 to ensure that each text portion is smaller than the maximum chunk size. However, a text chunk may already include one or more text portions added to the text chunk in a previous iteration.

In the event that the text portion fits into the last text chunk size, the text portion is inserted into the last text chunk at 610. If instead the text portion is the first to be processed, or the text portion does not fit into the last text chunk size, then the text portion is inserted into a new text chunk at 612. The new chunk may be created with a maximum size in accordance with the maximum text chunk size, which may be the maximum text chunk upon the first iteration or the reduced maximum text chunk size upon subsequent iterations.

A determination is made at 614 as to whether to select an additional text portion for processing. In some embodiments, additional text portions may be selected until all text portions have been added to a respective text chunk.

A determination is made at 616 as to whether the number of text chunks has increased relative to the previous maximum text chunk size. If the number of text chunks increases, then a reduced maximum text chunk size is determined at 618, and the text portions are again assigned into chunks in operations 606 through 614.

According to various embodiments, for the first iteration, the number of chunks will not have increased because there was no previous assignment of text portions into text chunks. However, for the second and subsequent iterations, reducing the maximum text chunk size at 618 may cause the number of text chunks needed to hold the text portions to crease because the reduced maximum text chunk size may cause a text portion to no longer fit in a chunk and instead to spill over to the next chunk.

In some embodiments, the first increase of the number of text chunks may cause the termination of the method at operation 620. Alternatively, a different terminating criterion may be met. For instance, an increase in the number of text chunks may be compared with the reduction in text chunk size to produce a ratio, and additional reductions in text chunk size may continue to be imposed so long as the ratio falls below a designated threshold.

In some embodiments, the reduced text chunk size may be determined at 618 in any of various ways. For example, the text chunk size may be reduced by a designated amount (e.g., 10 words, 5 kilobytes, etc.) As another example, the text chunk size may be reduced by a designated percentage (e.g., 1%, 5%, etc.).

When it is determined that the number of text chunks has unacceptably increased, then at 620 the previous maximum text chunk size and assignment of text portions into chunks is returned. In this way, the number of text chunks may be limited while at the same time dividing text portions more equally into text chunks. The number of text chunks may be strictly capped at the input value, or may be allowed to increase to some degree if a sufficiently improved division of text portions into text chunks is achieved.

Figure 7:
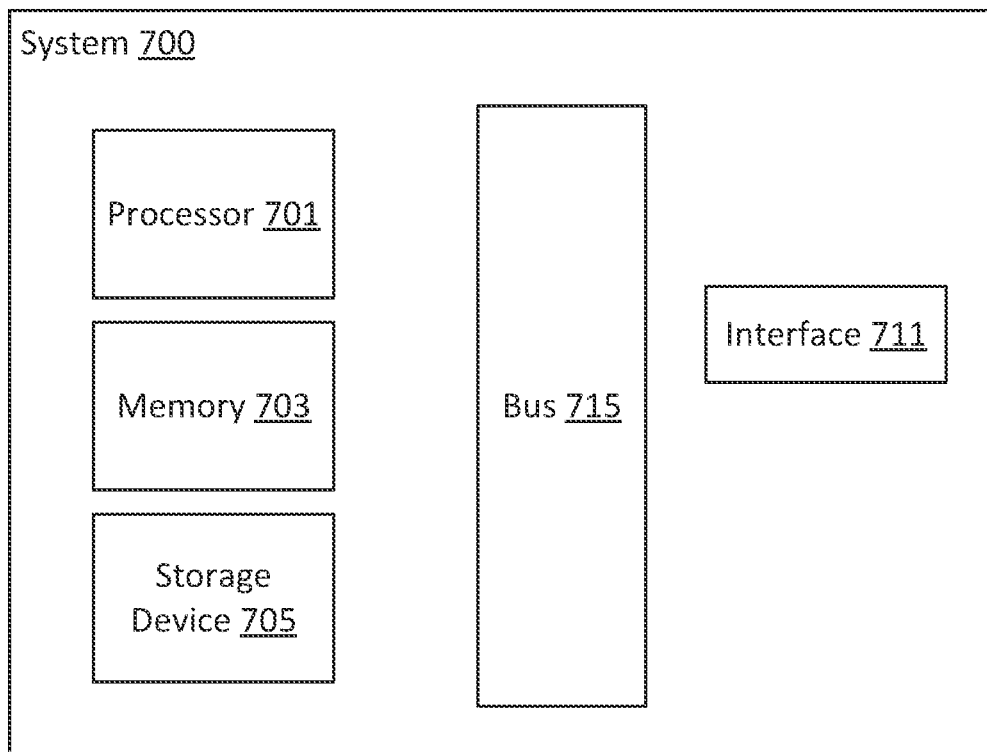
FIG. 7 illustrates one example of a computing device, configured in accordance with one or more embodiments.

FIG. 7 illustrates one example of a computing device 700, configured in accordance with one or more embodiments. According to various embodiments, a system 700 suitable for implementing embodiments described herein includes a processor 701, a memory module 703, a storage device 705, an interface 711, and a bus 715 (e.g., a PCI bus or other interconnection fabric.) System 700 may operate as variety of devices such as an application server, a database server, or any other device or service described herein. Although a particular configuration is described, a variety of alternative configurations are possible. The processor 701 may perform operations such as those described herein. Instructions for performing such operations may be embodied in the memory 703, on one or more non-transitory computer readable media, or on some other storage device. Various specially configured devices can also be used in place of or in addition to the processor 701. The interface 711 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Figure 8:
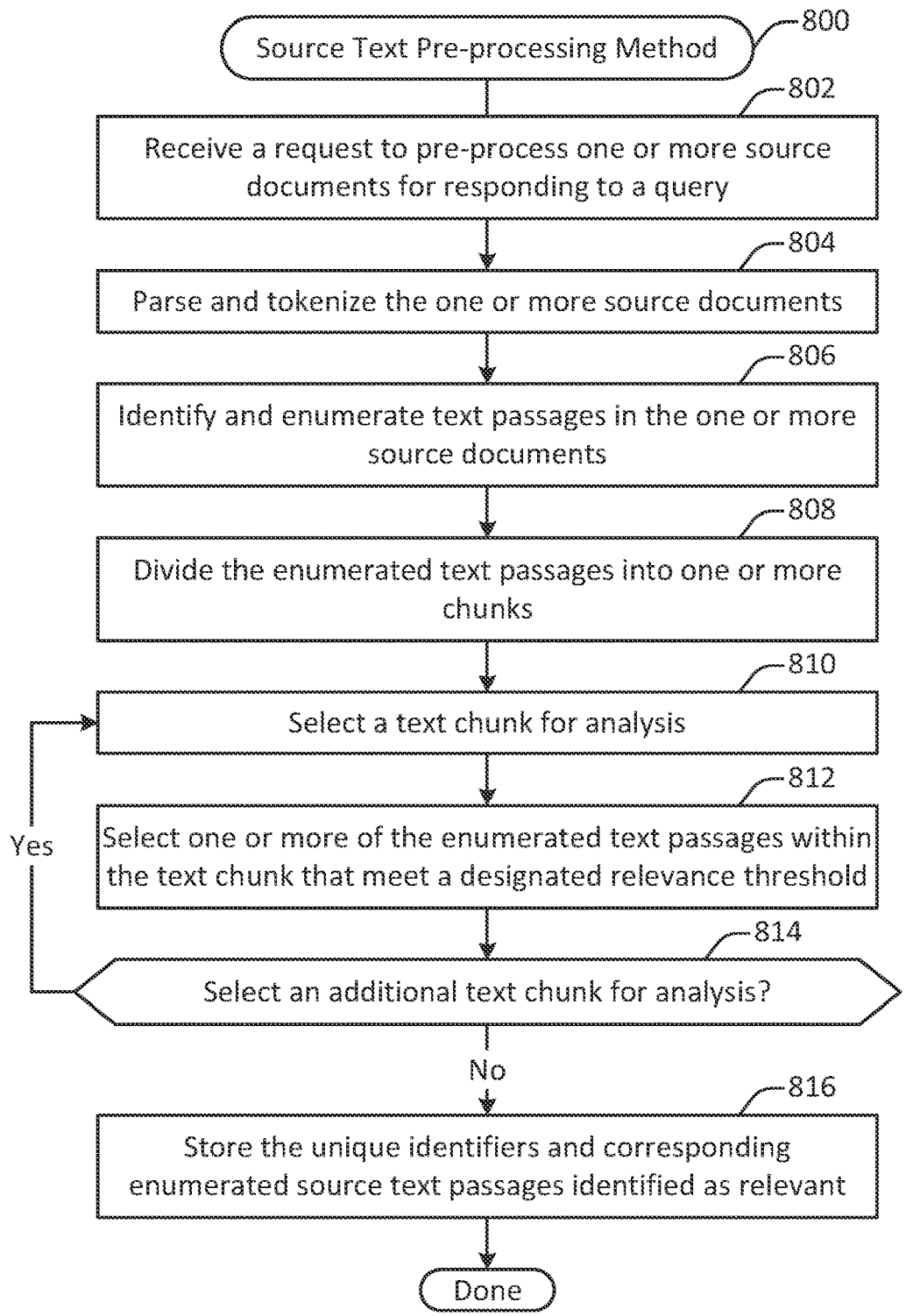
FIG. 8 illustrates a method for pre-processing source text, performed in accordance with one or more embodiments.

FIG. 8 illustrates a method 800 for pre-processing source text, performed in accordance with one or more embodiments. The method 800 may be performed at a text generation interface system such as the text generation interface system 210 shown in FIG. 2. The method 800 may be performed in order to divide one or more source documents into enumerated passages deemed relevant for answering a query.

A request to pre-process one or more source documents for responding to a query is received at 802. According to various embodiments, the request may be generated as discussed with respect to operation 102 shown in FIG. 1. The request may identify the query and the source documents. The request may be received via a chat interface, an application procedure interface, or any other suitable interface.

The one or more source documents are parsed and tokenized at 804. According to various embodiments, parsing and tokenizing the one or more source documents may involve performing operations such as optical character recognition, text splitting, text sharding, and the like. Examples of operations involved in dividing source documents into chunks are discussed throughout the application as filed, for instance with respect to FIG. 2 and FIG. 5.

Text passages in the one or more source documents are identified and enumerated at 806. According to various embodiments, text passages may be identified by dividing the text chunk into semantic units. For instance, a text chunk may be divided into sentences, phrases, paragraphs, groups of sentences, or any other suitable unit.

In some implementations, text passages may be identified via natural language processing text segmentation techniques such as sentence detection techniques. Alternatively, or additionally, a text chunk may be divided into text passages based on interaction with a large language model.

According to various embodiments, any suitable enumeration scheme may be used for creating the unique identifiers. For example, text passages may be identified by combining a document identifier with a sequentially generated text passage identifier. For instance, "D12-T14" may identify the 14th text passage in the 12th document of a set of source documents.

The enumerated text passages are divided into one or more chunks at 808. According to various embodiments, to execute a query based on one or more source documents, the source documents need to be divided into chunks where a chunk is a section of source document small enough to fit into a large language model's context window, allowing room for additional prompting instructions and room for the generated output text. The larger the context window, the larger the theoretical limit of the chunk size. Conversely, the smaller the context window, the smaller the limit of the chunk size. Examples of operations involved in dividing source documents into chunks are discussed throughout the application as filed, for instance with respect to FIG. 6.

A text chunk is selected for analysis at 810. According to various embodiments, text chunks may be analyzed in any suitable order, in sequence or in parallel.

At 812, one or more of the enumerated text passages that meet a designated relevance threshold are identified. According to various embodiments, the determination as to whether a text passage is relevant to the query may depend on the substance of the query and/or the type of query. For example, if the query involves summarizing the one or more source documents, then text passages worth summarizing may be identified as relevant, while those that include extraneous information may be omitted. As another example, if the query involves drafting an argument based on one or more source passages, then text passages pertaining to the argument may be identified as relevant, while those that are not may be omitted. As yet another example, if the query involves answering one or more questions based on the source documents, then text passages relating to the questions may be identified as relevant, while those that are not may be omitted.

A determination is made at 814 as to whether to identify an additional text chunk for analysis. In some embodiments, additional text chunks may be identified and analyzed until all of the text chunks have been analyzed and processed.

In some embodiments, one or more of the operations shown in FIG. 8 may be performed based on interaction with a large language model. For instance, a text passage identification prompt template may include natural language instructions that when executed by a large language model cause the large language model to perform operations such as identifying text passages, enumerating text passages, and/or evaluating text passages for relevance.

In some embodiments, a text passage identification prompt template may include one or more fillable portions. A fillable portion may be identified, for instance, via markup such as XML or JSON. To create a text passage identification prompt from the text passage identification prompt template, the one or more fillable portions may be filled with text. The fillable text portions may correspond to the text chunk and, optionally, the query.

An example of a text passage identification prompt template configured in accordance with one or more embodiments is as follows. The following prompt template is specific to document summarization. A different prompt template may be employed for a different task, such as formulating an argument or answering a question. In the following prompt template, the fillable portion "<passage-id={passage.id}>{passage.text}" is repeated and filled for the passages to be summarized.

Below are passages from a document and instructions for selecting certain passages.

chunk, and optionally the query. The text passage identification prompt may then be transmitted to a large language model for completion. The large language model may return a list of enumerated source text passages determined based on the text passage identification prompt.

According to various embodiments, the use of a text passage identification prompt does not necessarily imply that all of operations shown in FIG. 8 need be performed by a large language model. For example, in some embodiments the text passages may be identified and enumerated by a text generation interface system such as the text generation interface system 210 shown in FIG. 2. The resulting text passages may then be evaluated for relevance by a large language model.

Upon determining not to identify an additional text chunk for analysis, the unique identifiers and corresponding text passages identified as relevant are stored on a storage device at 816. In some embodiments, the identifiers and corresponding text passages may be stored at least in part so that subsequent analysis may refer to the text passages by identifier rather than quoting an entire text passage.

According to various embodiments, one or more of the operations shown in FIG. 8 may be performed in an order different than that shown. For instance, one or more operations may be performed in parallel rather than in sequence.

Figure 9:
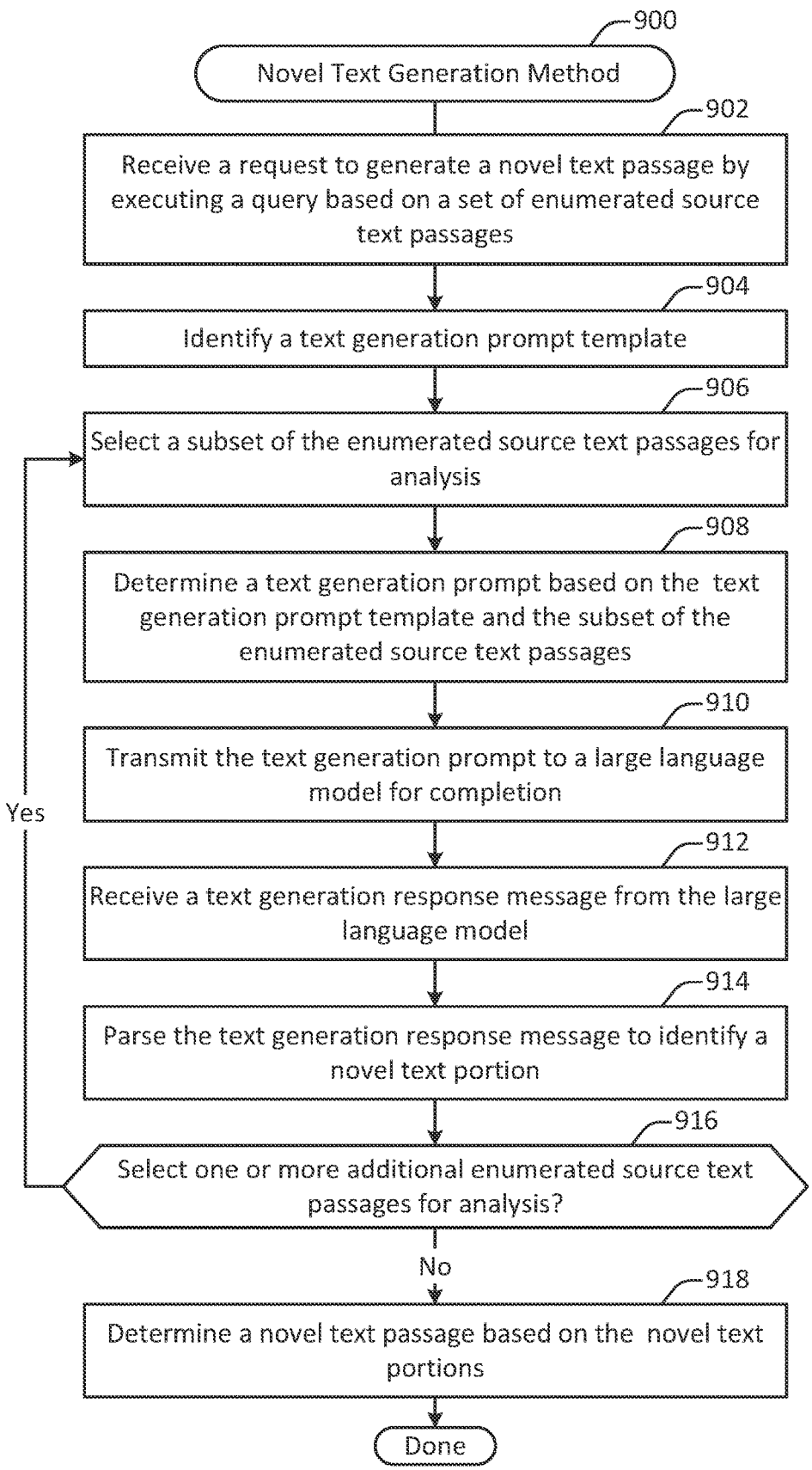
FIG. 9 illustrates a method for generating a novel text, performed in accordance with one or more embodiments.

FIG. 9 illustrates a text generation method 900, performed in accordance with one or more embodiments. The method 900 may be performed at a text generation interface system such as the text generation interface system 210 shown in FIG. 2. The method 900 may be performed in order to execute a query to generate novel text based on enumerated source text passages determined as discussed with respect to the method 800 shown in FIG. 8.

A request to generate novel text by executing a query based on a set of enumerated source text passages is received at 902. In some embodiments, the request may be generated as discussed with respect to the operation 104 shown in FIG. 1. The request may identify the query and the enumerated source text passages identified based on the source documents as discussed with respect to the method 800 shown in FIG. 8.

---

Your task is to follow those instructions and to select only the passages that meet the criteria described in the instructions.
The passages are listed one per line, with each passage prepended by a tag of the format '<passage-id=$PASSAGE_ID>', where $PASSAGE_ID is a unique ID of the passage.
Your instructions are to select the passages that are needed to generate a summary of the full set of passages.
In other words, passages that are less relevant for summarization purposes should not be selected, while passages that can be used to provide a high-quality summary should be selected.
Passages that contain names, dates, and amounts of money are likely to be relevant.
PASSAGES:
{FOR passage in passages}
    <passage-id={passage.id}> {passage.text}
Your output must be a comma-delimited list of passage IDs. For example, given the passages:
<passage-id=1> Peanut butter goes with chocolate.
<passage-id=5> Cats are better than dogs.
<passage-id=8> Peanut butter goes with jelly.
And the instructions: select only the passages that mention food.
You would select passages 1 and 8, and thus your output should be:
    passage_ids:1,8
<|endofprompt|>

---

In some embodiments, performing one or more of operations shown in FIG. 8 may involve creating a text passage identification prompt from the prompt template, a text A text generation prompt template is identified at 904. According to various embodiments, the text generation prompt template may be a text document or the like. The text generation prompt template may include one or more fillable elements that may be replaced with the query and all or a subset of the enumerated source text passages. The one or more fillable elements may be identified via markup specified in a markup language such as XML or JSON.

In some embodiments, the text generation prompt template may include natural language instructions for generating novel text based on the enumerated source text passages. The natural language instructions may instruct the large language model to link the novel text generated based on the query with one or more identifiers corresponding to enumerated source text passages supporting the novel text. In this way, a portion of novel text may be linked to source material used to construct it, for instance to facilitate accuracy verification as discussed with respect to the method 1000 shown in FIG. 10.

According to various embodiments, the natural language instructions may depend on the type of query being executed. For example, the natural language instructions may instruct the large language model to translate the enumerated source text passages into a different language. As another example, the natural language instructions may instruct the large language model to summarize the enumerated source text passages. As yet another example, the natural language instructions may instruct the large language model to construct an argument based on the enumerated source text passages.

An example of a text generation prompt template configured in accordance with one or more embodiments is as follows. The following text passage generation prompt template is specific to a summarization task. A text passage generation prompt template used to perform a different task, such as answering a query or generating an argument, may have different instructions. In the following text passage generation prompt template, the fillable portion "{num_sentences_desired}" may be used to specify a length for the summary, while the fillable portion "<passage-id={passage.id}>{passage.text}" is repeated and filled for the passages to be summarized.

---

You will be given several passages from a document.
Each passage has already been deemed potentially relevant to summarizing the full document.
The passages are listed one per line, with each passage prepended by a tag of the format '<passage-id=$PASSAGE_ID>', where $PASSAGE_ID is a unique ID of the passage.
Your task is to write a coherent summary based on the passages. Depending on the desired length of the summary, you might need to omit some information from the passages. Use your best judgment to focus on what is most important. A good summary will allow the reader to quickly assess whether it is worth their time to read the rest of the document.
The summary should be approximately {num_sentences_desired} sentences long.
<passages>
   <passage-id={passage.id}> {passage.text}
</passages>
Your output should be divided into two parts: the prose text of the summary you generate, and a comma-delimited list of the passage IDs that support the facts asserted in the summary. Your output should be written as a single sentence per line. At the end of each line, provide the IDs of any cited passages that provide the factual basis for the summary line.
For example, given the following passages:
<passage-id=1> Peanut butter goes with chocolate.
<passage-id=5> Cats are better than dogs.
<passage-id=8> Peanut butter goes with jelly.
<passage-id=24> 2d9jlsljk02
<passage-id=27> Dogs are better than mice.
For example, if you were to write a two-sentence summary of the preceding passages, your output should be the following two lines:
   <line><summary>Peanut butter goes with jelly or chocolate .</summary><cited_passage_ids>1,8</cited_passage_ids></line>
   <line><summary>Cats are better than dogs, but dogs are better than mice.</summary><cited_passage_ids>5,28</cited_passage_ids></line>
<|endofprompt|>

---

A subset of the enumerated source text passages is selected for analysis at 906. According to various embodiments, the enumerated source text passages may be divided into subsets when the enumerated source text passages are too numerous for inclusion in a single text generation response prompt, leaving room for instructions and the novel text generated by the large language model.

According to various embodiments, the enumerated source text passages may be divided into subsets and analyzed in any suitable order, in sequence or in parallel. For example, the enumerated source text passages may be grouped by the chunk from which they were extracted. As another example, the enumerated source text passages may be re-grouped according to some other scheme, such as by topic determined based on topical analysis.

A text generation prompt is determined at 908 based on the text generation prompt template and the subset of the enumerated source text passages. In some embodiments, the text generation prompt may be generated by filling the one or more fillable portions in the text generation prompt template with the subset of the enumerated source text passages and the query.

The text generation prompt is transmitted to a large language model for completion at 910. A text generation response message is received from the large language model at 912. The text generation response message is parsed at 914 to identify a novel text portion. Parsing the text generation response message may involve, for instance, separating the novel text portion generated by the large language model from the rest of the completed text generation response message.

A determination is made at 916 as to whether to select one or more additional enumerated source text passages for analysis. According to various embodiments, additional enumerated source text passages may continue to be selected until all enumerated source text passages identified as relevant have been analyzed.

Upon determining not to select an additional enumerated text passage for analysis, a novel text passage is determined at 918 based on the novel text portions. In some embodiments, determining a novel text passage may involve combining novel text portions for different subsets of the enumerated source text passages into a single novel text. The novel text passage may include text generated by the large language model in response to the query, along with one or more identifiers linking the generated text to the enumerated source text passages.

According to various embodiments, the manner in which the novel text portions are combined may depend in part on the type of query being analyzed. For example, in the case of summarization, successive novel text portions may be concatenated to determine an overall summary of the set of enumerated source text passages. As another example, in the case of answering a natural language question, two or more novel text portions may be combined by determining and then completing a text consolidation prompt.

Figure 10:
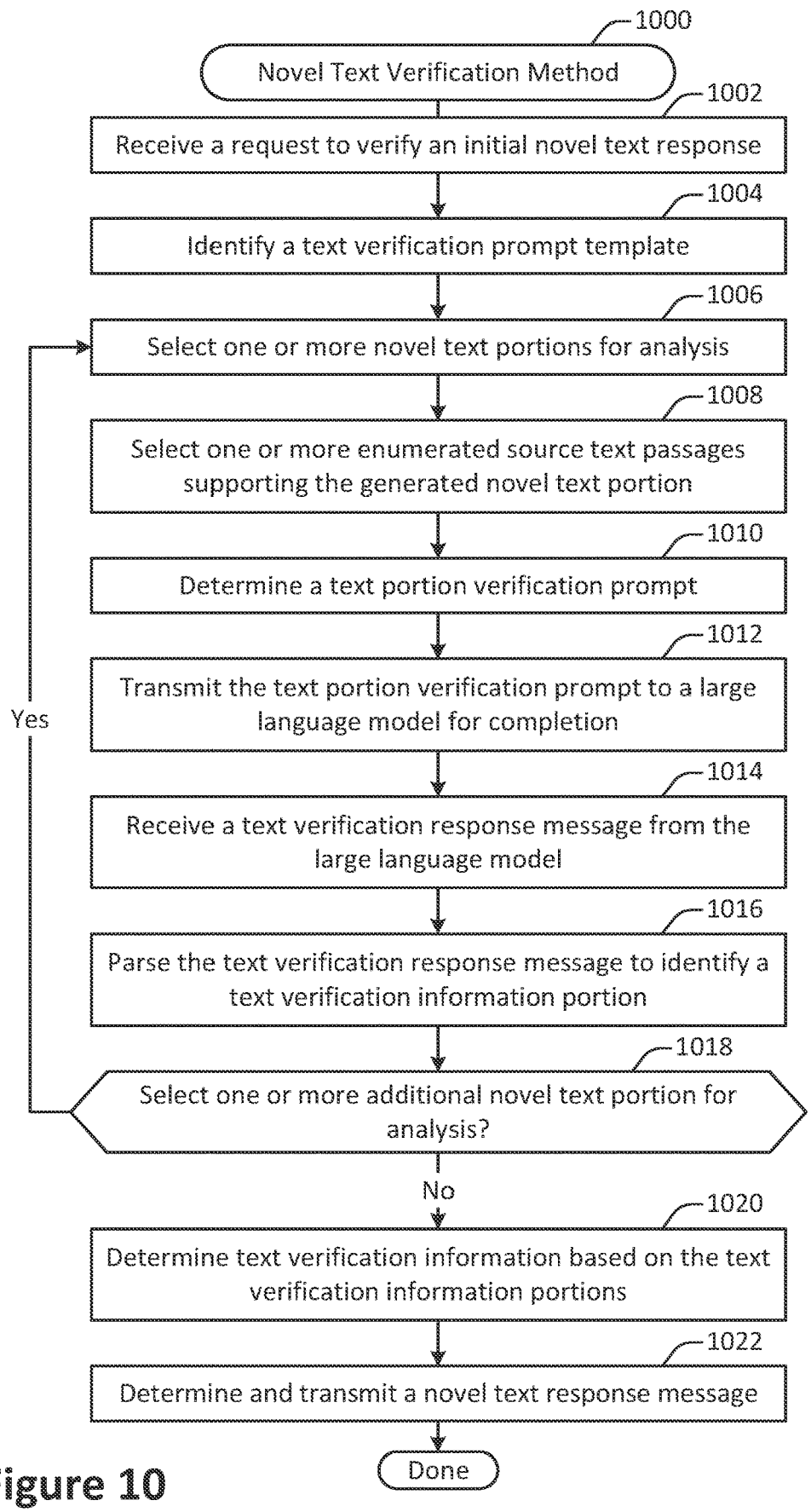
FIG. 10 illustrates a method of verifying novel text, performed in accordance with one or more embodiments.

FIG. 10 illustrates a method 1000 of verifying novel text, performed in accordance with one or more embodiments. The method 1000 may be performed at a text generation interface system such as the text generation interface system 210 shown in FIG. 2. The method 1000 may be performed in order to verify and optionally correct novel text generated in accordance with the method 900 shown in FIG. 9.

A request to verify novel text is received at 1002. In some embodiments, the request may be generated as discussed with respect to the operation 106 shown in FIG. 1. The request may include information such as the query the novel text is responsive to, one or more source passages used to generate the novel text, and the novel text itself.

A text verification prompt template is identified at 1004. According to various embodiments, the text verification prompt template may include one or more fillable portions that may be filled with any or all of the information discussed with respect to operation 1002. The text verification prompt template may also include one or more natural language instructions to be executed by the large language model to verify the novel text. For instance, the text verification prompt template may include instructions such as: "Given the above source passages, and the generated passage, are all facts asserted in the generated passage supported by the source passages?"

In some embodiments, an example of a text verification prompt template is as follows:

---

You will be given several passages from a document.
Each passage was used as input for a machine-generated summary of the original document, which will also be given to you.
The passages are listed one per line, with each passage prepended by a tag of the format '<passage-id=$PASSAGE_ID>', where $PASSAGE_ID is a unique ID of the passage.
Your task is to fact check the machine generated summary using the passages. For each fact asserted in the summary, make sure that it is fully supported by one or more of the passages. Pay extra attention to detail. Names, dates, amounts of money all must be expressed in the summary exactly as they appear in the passage. Small details matter, and no piece of information is too small.
The style of the fact check should be direct, and to the point. Avoid editorializing.
<passages>
    <passage-id={passage.id}> {passage.text}
</passages>
<summary>
    {generated_text}
</summary>
  Your output should succinctly declare whether or not the summary is reliable, by emitting either 0 or 1. Emit 0 when the summary is not reliable, and emit 1 when it is fully reliable. A summary is reliable when all facts asserted in the summary are fully supported by the passages. Mere omission of a fact or facts from a passage is not a reason to deem a summary unreliable.
  A summary is only unreliable when all or some of its assertions cannot be fully backed up by the passages.
  After emitting the summary score (0 or 1), include a prose list of reasons. The reasons should cite to specific passages when applicable. A citation to a passage should be in the form of an XML tag: <passage-cite id="$PASSAGE_ID">passage $PASSAGE_ID</passage-cite>.
  If a summary is unreliable because it does not mention any of the information found in the passages, refrain from citing specific passages in your reason.
  Example output for an unreliable summary:
    <score>0</score><reasons>The summary is not reliable because <passage-cite id="7">passage 7</passage-cite> states that...</reasons>
  Example output for an unreliable summary where no passage directly contradicts it, but no passage supports the facts asserted in the summary:
  <score>0</score><reasons>The summary is unreliable because it mentions X, Y, Z, while none of the passages mention X, Y, or Z.</reasons>
  Example output for a reliable summary:
    <score>1</score><reasons>The summary is reliable because...</reasons>
<|endofprompt|>

---

A novel text portion is selected for analysis at 1006. According to various embodiments, novel text portions may be analyzed in any suitable order, in sequence or in parallel.

One or more enumerated source text passages supporting the generated novel text portion are selected at 1008. In some embodiments, the one or more enumerated source text passages may be identified based on the references included with a novel text portion by the large language model when the large language model generated the novel text portion.

For instance, the one or more enumerated source text passages may be identified by retrieving the source text passages stored at operation 818 in FIG. 8 based on the identifiers included with the novel text portion during generation by the large language model.

A text portion verification prompt is determined at 1010. In some embodiments, the text portion verification prompt may be determined by filling the one or more fillable portions of the text verification prompt template with information such as the one or more enumerated source text passages, the one or more novel text portions selected at 1006, and/or the query.

The text portion verification prompt is transmitted to a large language model for completion at 1012. A text verification response message is received from the large language model at 1014. The text verification response message is then parsed to identify a text verification information portion at 1016. In some embodiments, parsing the text verification response message may involve extracting the text identification information portion from the other elements of the text verification response message, such as the prompt instructions and filled portions.

In some embodiments, the text verification information may include a score, such as 0 or 1, indicating an extent to which the novel text is supported by the enumerated text passages. Alternatively, or additionally, a narrative explanation of the support or lack thereof in the enumerated text passage or passages may be provided.

A determination is made at 1018 as to whether to select one or more novel text portions for analysis. According to various embodiments, additional novel text portions may continue to be selected until all generated novel text portions have been analyzed.

Upon determining not to select an additional novel text portion for analysis, at 1020 text verification information is determined based on the text verification information portions. According to various embodiments, the text verification information may identify one or more novel text portions as being unsupported or imperfectly supported by the one or more corresponding enumerated text passages. The text verification information may be determined by aggregating the text verification information portions determined at 1016.

A novel text response message is determined and transmitted at 1022. In some embodiments, the novel text response message may include some or all of the novel text passage. For example, the novel text response message may include the portions of the novel text passage identified as being adequately supported by the enumerated source text passages. As another example, the novel text response message may include all of the novel text passage.

In some embodiments, the novel text response message may include some or all of the text verification information. For instance, the novel text response message may identify one or more novel text portions as being inadequately supported by the enumerated source text passages.

In some implementations, determining the novel text response message may involve issuing an instruction to re-generate some or all of the novel text passage. For example, one or more portions of the novel text passage that have been identified as inadequately supported may be regenerated. As another example, the entire novel text passage may be regenerated. Because large language models often include one or more parameters (e.g., "temperature") that provide for a degree of non-determinism in the generation of novel text, a newly generated novel text passage may not suffer from the same inaccuracies.

In some embodiments, the newly generated novel text passages may then be generated in the same way and subject to the same types of text verification discussed with respect to the methods shown in FIG. 8, FIG. 9, and FIG. 10. Alternatively, or additionally, one or more instructions may be altered in some way to guide the large language model to avoid generating text that is unsupported by the enumerated source text passages.

In particular embodiments, multiple novel text passages may be generated from the same source text and query. Then, the novel text passage that is best supported by the source text may be selected for inclusion in the novel text response message.

In some embodiments, the novel text response message may be transmitted to a client machine. For instance, the novel text response message may be transmitted via a chat interface, application procedure interface, or other suitable communication medium. Alternatively, or additionally, the novel text response message may be transmitted to a storage system for storing the novel text passage and/or the text verification information.

According to various embodiments, text verification information may be used to route novel text along any of various paths. For instance, novel text may be sent to a human reviewer for analysis.

According to various embodiments, one or more of the operations shown in FIG. 10 may be performed via natural language processing techniques other than a large language model. For instance, a classification model such as a shallow or deep neural network may be used to determine an extent to which a novel text passage is supported by one or more enumerated source text passages. In such a configuration, a softmax probability score such as a score between 0.0 and 1.0 may be produced.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of large language models. However, the techniques disclosed herein apply to a wide variety of language models. Particular embodiments may be implemented without some or all of the specific details described herein. In other instances, well known process operations have not been described in detail in order to avoid unnecessarily obscuring the disclosed techniques. Accordingly, the breadth and scope of the present application should not be limited by any of the implementations described herein, but should be defined only in accordance with the claims and their equivalents.

The invention claimed is:

1. A method comprising:
    determining a plurality of enumerated source text passages based on one or more source text documents, each of the plurality of enumerated source text passages being included in one or more of the one or more source text documents, each enumerated source text passage of the plurality of enumerated source text passages including a respective source text passage identifier that uniquely identifies the enumerated source text passage;
    determining a novel text passage based on a query and the plurality of enumerated source text passages, the novel text passage including a plurality of novel text portions, one or more text portions of the plurality of novel text portions including a respective one or more cited source text passage identifiers;
    transmitting a text verification prompt to a large language model, the text verification prompt including a designated novel text portion of the plurality of novel text portions, the text verification prompt including a designated one or more enumerated source text passages identified in the designated novel text portion, the text verification prompt including a natural language instruction to evaluate whether the designated novel text portion is supported by the designated one or more enumerated source text passages;
    receiving from the large language model a text verification response message including text verification information indicating that the designated novel text portion is insufficiently supported by the designated one or more enumerated source text passages; and
    transmitting to a client machine a novel text generation message determined based on the text verification information and including novel text generated by the large language model.

2. The method recited in claim 1, the method further comprising:
    selecting a subset of the plurality of enumerated source text passages based on their relevance to the query, wherein the novel text passage is determined based on the selected subset of the plurality of enumerated source text passages.

3. The method recited in claim 2, wherein the subset of the plurality of enumerated source text passages is selected based on a completed relevance prompt received from a large language model, the completed relevance prompt being determined based on an input relevance prompt that includes one or more natural language instructions executed by the large language model to select the subset of the plurality of enumerated source text passages.

4. The method recited in claim 1, wherein the novel text passage is generated by the large language model based on a text generation prompt sent to the large language model, the text generation prompt including one or more of the plurality of enumerated source text passages and one or more natural language instructions to generate the novel text passage based on the one or more of the plurality of enumerated source text passages.

5. The method recited in claim 1, wherein the query includes a request to summarize the one or more source text documents.

6. The method recited in claim 1, wherein the query includes a request to answer one or more questions based on the one or more source text documents.

7. The method recited in claim 1, wherein the query includes a request to generate an argument based on the one or more source text documents.

8. One or more non-transitory computer readable media having instructions stored thereon for performing a method, the method comprising:
    determining a plurality of enumerated source text passages based on one or more source text documents, each of the plurality of enumerated source text passages being included in one or more of the one or more source text documents, each enumerated source text passage of the plurality of enumerated source text passages including a respective source text passage identifier that uniquely identifies the enumerated source text passage;
    determining a novel text passage based on a query and the plurality of enumerated source text passages, the novel text passage including a plurality of novel text portions, one or more text portions of the plurality of novel text portions including a respective one or more cited source text passage identifiers;
    transmitting a text verification prompt to a large language model, the text verification prompt including a designated novel text portion of the plurality of novel text portions, the text verification prompt including a designated one or more enumerated source text passages identified in the designated novel text portion, the text verification prompt including a natural language instruction to evaluate whether the designated novel text portion is supported by the designated one or more enumerated source text passages;
    receiving from the large language model a text verification response message including text verification information indicating that the designated novel text portion is insufficiently supported by the designated one or more enumerated source text passages; and
    transmitting to a client machine a novel text generation message determined based on the text verification information and including novel text generated by the large language model.

9. The one or more non-transitory computer readable media recited in claim 8, the method further comprising:
    selecting a subset of the plurality of enumerated source text passages based on their relevance to the query, wherein the novel text passage is determined based on the selected subset of the plurality of enumerated source text passages.

10. The one or more non-transitory computer readable media recited in claim 9, wherein the subset of the plurality of enumerated source text passages is selected based on a completed relevance prompt received from the large language model, the completed relevance prompt being determined based on an input relevance prompt that includes one or more natural language instructions executed by the large language model to select the subset of the plurality of enumerated source text passages.

11. The one or more non-transitory computer readable media recited in claim 8, wherein the novel text passage is generated by the large language model based on a text generation prompt sent to the large language model, the text generation prompt including one or more of the plurality of enumerated source text passages and one or more natural language instructions to generate the novel text passage based on the one or more of the plurality of enumerated source text passages.

12. The one or more non-transitory computer readable media recited in claim 8, wherein the query includes a request to summarize the one or more source text documents.

13. The one or more non-transitory computer readable media recited in claim 8, wherein the query includes a request to answer one or more questions based on the one or more source text documents.

14. The one or more non-transitory computer readable media recited in claim 8, wherein the query includes a request to generate an argument based on the one or more source text documents.

15. A system comprising:
one or more processors configured to perform a method, the method comprising:
determining a plurality of enumerated source text passages based on one or more source text documents, each of the plurality of enumerated source text passages being included in one or more of the one or more source text documents, each enumerated source text passage of the plurality of enumerated source text passages including a respective source text passage identifier that uniquely identifies the enumerated source text passage;
determining a novel text passage based on a query and the plurality of enumerated source text passages, the novel text passage including a plurality of novel text portions, one or more text portions of the plurality of novel text portions including a respective one or more cited source text passage identifiers;
transmitting a text verification prompt to a large language model, the text verification prompt including a designated novel text portion of the plurality of novel text portions, the text verification prompt including a designated one or more enumerated source text passages identified in the designated novel text portion, the text verification prompt including a natural language instruction to evaluate whether the designated novel text portion is supported by the designated one or more enumerated source text passages;
receiving from the large language model a text verification response message including text verification information indicating that the designated novel text portion is insufficiently supported by the designated one or more enumerated source text passages; and
transmitting to a client machine a novel text generation message determined based on the text verification information and including novel text generated by the large language model.

16. The system recited in claim 15, the method further comprising:
selecting a subset of the plurality of enumerated source text passages based on their relevance to the query, wherein the novel text passage is determined based on the selected subset of the plurality of enumerated source text passages.

17. The system recited in claim 16, wherein the subset of the plurality of enumerated source text passages is selected based on a completed relevance prompt received from the large language model, the completed relevance prompt being determined based on an input relevance prompt that includes one or more natural language instructions executed by the large language model to select the subset of the plurality of enumerated source text passages.

18. The system recited in claim 15, wherein the novel text passage is generated by the large language model based on a text generation prompt sent to the large language model, the text generation prompt including one or more of the plurality of enumerated source text passages and one or more natural language instructions to generate the novel text passage based on the one or more of the plurality of enumerated source text passages.

19. The system recited in claim 15, wherein the query includes a request to summarize the one or more source text documents.

20. The system recited in claim 15, wherein the query includes a request to answer one or more questions based on the one or more source text documents.

* * * * *